United States Patent
Mashiach et al.

(10) Patent No.: US 11,354,606 B2
(45) Date of Patent: Jun. 7, 2022

(54) SYSTEMS AND METHODS FOR MANAGING EVENTS

(71) Applicant: EVED, L.L.C., Skokie, IL (US)

(72) Inventors: Talia Mashiach, Chicago, IL (US); Kelly Fifield, Buffalo Grove, IL (US); Susan Buckles, Plainfield, IL (US); Michael Lambert, Highwood, IL (US)

(73) Assignee: EVED, L.L.C., Skokie, IL (US)

( * ) Notice: Subject to any disclaimer, the term of this patent is extended or adjusted under 35 U.S.C. 154(b) by 0 days.

(21) Appl. No.: 17/194,838

(22) Filed: Mar. 8, 2021

(65) Prior Publication Data

US 2021/0279653 A1    Sep. 9, 2021

Related U.S. Application Data

(63) Continuation of application No. 15/676,824, filed on Aug. 14, 2017, now Pat. No. 10,943,190, which is a continuation of application No. 12/974,977, filed on Dec. 21, 2010, now Pat. No. 9,734,467.

(60) Provisional application No. 61/299,769, filed on Jan. 29, 2010.

(51) Int. Cl.
*G06Q 10/06* (2012.01)
*G06Q 30/04* (2012.01)
*G06Q 10/02* (2012.01)

(52) U.S. Cl.
CPC ............ *G06Q 10/06* (2013.01); *G06Q 30/04* (2013.01)

(58) Field of Classification Search
CPC ............................... G06Q 10/06; G06Q 30/04
USPC ......................................................... 705/34
See application file for complete search history.

(56) References Cited

U.S. PATENT DOCUMENTS

| | | | |
|---|---|---|---|
| 5,634,016 A | 6/1997 | Steadham, Jr. et al. | |
| 6,363,351 B1 * | 3/2002 | Moro | G07C 9/27 340/5.2 |
| 7,590,592 B2 * | 9/2009 | Etkin | G06Q 10/02 705/37 |
| 2002/0032592 A1 | 3/2002 | Krasnick et al. | |
| 2002/0046076 A1 * | 4/2002 | Baillargeon | G06Q 10/02 705/5 |
| 2002/0072939 A1 | 6/2002 | Kawaberi | |
| 2002/0143688 A1 | 10/2002 | Truitt et al. | |
| 2002/0156787 A1 | 10/2002 | Jameson et al. | |
| 2005/0097571 A1 | 5/2005 | Uguccioni | |

(Continued)

OTHER PUBLICATIONS

Emisha, Venue Brochure, available at http://www.emisha.com/cmsimages/venue%20brochure.pdf.

(Continued)

*Primary Examiner* — Garcia Ade
(74) *Attorney, Agent, or Firm* — Finnegan, Henderson, Farabow, Garrett & Dunner LLP

(57) ABSTRACT

Systems and methods consistent with the invention may include receiving, by a portal, requests from entities to become members, selectively granting the requests by the portal, receiving information by the portal from a plurality of first members, in response to requests from the first members, creating member files in the database using the received information, the files corresponding to the first members, receiving an information request by the portal from a second member, and selectively supplying by the portal to the second member, information from at least one of the files, the supplied information being selected based on the requests.

20 Claims, 8 Drawing Sheets

(56) References Cited

U.S. PATENT DOCUMENTS

| | | |
|---|---|---|
| 2005/0171830 A1 | 8/2005 | Miller et al. |
| 2005/0203783 A1 | 9/2005 | Allen et al. |
| 2005/0209914 A1 | 9/2005 | Nguyen |
| 2006/0010023 A1 | 1/2006 | Tromczynski et al. |
| 2006/0235748 A1 | 10/2006 | Gordon et al. |
| 2006/0265418 A1 | 11/2006 | Dolezal et al. |
| 2006/0271381 A1 | 11/2006 | Pui |
| 2007/0050197 A1 | 3/2007 | Efon et al. |
| 2007/0094295 A1* | 4/2007 | Klehr .................. G06Q 10/06 707/999.102 |
| 2007/0250372 A1 | 10/2007 | Arbouzov |
| 2008/0133286 A1* | 6/2008 | Islam ................ G06Q 30/0601 705/26.1 |
| 2008/0201196 A1 | 8/2008 | Rowland |

OTHER PUBLICATIONS

Communication and Supplementary European Search Report issued in European Application No. EP11737560, dated Nov. 19, 2014.
International Search Report and Written Opinion issued in International Application No. PCT/US11/22545, dated Mar. 25, 2011.

* cited by examiner

SYSTEMS AND METHODS FOR MANAGING EVENTS

RELATED APPLICATION

This application claims the benefit of U.S. Provisional Patent Application No. 61/299,769, filed Jan. 29, 2010, the entire disclosure of which is hereby expressly incorporated herein by reference.

BACKGROUND

Technical Field

Systems and methods consistent with the present invention generally relate to event planning.

Background

Event planning involves the selection and coordination of many entities and activities. For example, event planners must select and manage the delivery of many products and services to provide successful execution of an activity or event. Event planners must also carefully manage the suppliers of these products and services to ensure that they meet particular budget and quality constraints.

An event may be held at various types of locations, also referred to as "venues" or "sites," such as a city convention center, a hotel, or a conference center. Some events may be held at multiple locations within a specific geographic location, such as a city-wide conference that involves a convention center and several different hotels. Other events, such as the launch of a new product or service, may be held simultaneously at multiple locations within a country or across the world. In such nationwide product launches, for example, a national company may solicit the help and expertise of several local planners who have location-specific knowledge and business relationships.

Many types of vendors offer to provide products and/or services to the meeting and event industry, including caterers, audio-visual equipment providers, trade show services and equipment companies, florists, linen companies, rental companies, temporary staffing companies, temporary security companies, promotional materials manufacturers, decorators, entertainers, transportation companies, wholesalers, and others. Vendors may vary in size and geographic reach.

Event planners may use the services of other event planners where the latter has destination-specific knowledge of the event location. For example, an event planner may be asked to plan and coordinate an event that will take place in a foreign country. The event planner may utilize the services of a second event planner located in the foreign country, because the second event planner may have more destination-specific knowledge of the event location and the various vendors who serve that particular geographic area.

Event planners may also want to establish preferred relationships with particular vendors. Such preferred relationships may allow the event planner to obtain optimal pricing, control the quality of the products or services delivered, gain a greater understanding of the vendor's products or services, and ensure that the vendor meets or maintains adequate insurance to participate in an event.

When an event is planned at a specific venue, multiple vendors may require access to the venue before, during, and after the event. For example, a company providing pipe and drape, tables, chairs, and other equipment may require access to the venue before and after the event for set-up and break-down. A caterer providing food and beverage for the event may require access to the location before and during the event for set-up and serving. Other vendors may also require access to the venue around the time of the event.

The logistics involved in selecting and coordinating multiple vendors for a single event can be complex and time-consuming. For example, a venue may have specific insurance requirements for vendors. Also, if a hotel has only one loading dock but four different vendors must move equipment through the dock for an event, careful coordination is needed among the various vendors. In another example, one conference may be moving out of a convention center at the same time that another conference is moving in. Alternatively, many facilities may host multiple events at the same time. For example, a large hotel may host several weddings on the same day. The selection and coordination of multiple vendors for multiple events, involving one or many locations, can quickly become unmanageable.

Embodiments consistent with the present invention provide improved computer-implemented systems and methods for managing event-planning, event-coordination, event-execution, procurement of products and services for events, and payments associated with each.

SUMMARY

A computer-implemented method for managing event planning is disclosed. The method includes receiving, by a portal, requests from entities to become members; selectively granting the requests by the portal; receiving information by the portal from a plurality of first members; creating member files in a database using the received information in response to requests from the first members, the files corresponding to the first members; receiving an information request by the portal from a second member; and selectively supplying by the portal to the second member, information from at least one of the files, the supplied information being selected based on the requests.

A computer-implemented method for managing event planning is disclosed. The method includes selectively granting, by a portal, requests to become members; receiving requests to the portal from members to be a host for an event; designating a host by the portal, by selectively granting one of the member requests; receiving information regarding the event by the portal from the host; receiving proposals for the event by the portal from a plurality of members; receiving, by the portal from the host, a plurality of selections of candidate vendors based on the member proposals; receiving, by the portal from the host, a designation of a selected venue; receiving insurance requirements by the portal from the selected venue; receiving insurance information by the portal from a plurality of candidate vendors; performing comparisons of the insurance information to the insurance requirements; and designating at least one of the candidate vendors as an authorized vendor, based on the comparisons.

A computer-implemented method for managing event planning is disclosed. The method includes selectively granting, by a portal, requests to become members; receiving requests to the portal from members to be a host for an event; designating a host by selectively granting, by the portal, one of the member requests; receiving information regarding the event by the portal from the host; receiving proposals for the event by the portal from a plurality of members; receiving, from the host by the portal, a plurality of selections of candidate vendors based on the member proposals; receiving, from the host by the portal, a designation of a selected venue; receiving requests by the portal from members for access to an area of the selected venue; selectively granting, by the portal, the area access requests; and supplying access indicators to the members associated with the granted access requests.

A computer-readable storage medium comprising instructions, which when executed on a processor, causes the processor to perform a method for managing event planning, is disclosed. The method includes receiving, by a portal, requests from entities to become members; selectively granting the requests by the portal; receiving information by the portal from a plurality of first members; creating member files in a database using the received information in response to requests from the first members, the files corresponding to the first members; receiving an information request by the portal from a second member; and selectively supplying by the portal to the second member, information from at least one of the files, the supplied information being selected based on the requests.

A computer-readable storage medium comprising instructions, which when executed on a processor, causes the processor to perform a method for managing event planning, is disclosed. The method includes selectively granting, by a portal, requests to become members; receiving requests to the portal from members to be a host for an event; designating a host by the portal, by selectively granting one of the member requests; receiving information regarding the event by the portal from the host; receiving proposals for the event by the portal from a plurality of members; receiving, by the portal from the host, a plurality of selections of candidate vendors based on the member proposals; receiving, by the portal from the host, a designation of a selected venue; receiving insurance requirements by the portal from the selected venue; receiving insurance information by the portal from a plurality of candidate vendors; performing comparisons of the insurance information to the insurance requirements; and designating at least one of the candidate vendors as an authorized vendor, based on the comparisons.

A computer-readable storage medium comprising instructions, which when executed on a processor, causes the processor to perform a method for managing event planning, is disclosed. The method includes selectively granting, by a portal, requests to become members; receiving requests to the portal from members to be a host for an event; designating a host by selectively granting, by the portal, one of the member requests; receiving information regarding the event by the portal from the host; receiving proposals for the event by the portal from a plurality of members; receiving, from the host by the portal, a plurality of selections of candidate vendors based on the member proposals; receiving, from the host by the portal, a designation of a selected venue; receiving requests by the portal from members for access to an area of the selected venue; selectively granting, by the portal, the area access requests; and supplying access indicators to the members associated with the granted access requests.

BRIEF DESCRIPTION OF THE DRAWINGS

The accompanying drawings, which are incorporated in and constitute a part of this disclosure, illustrate various exemplary embodiments and aspects consistent with the present invention. In the drawings.

DETAILED DESCRIPTION

Figure 1:
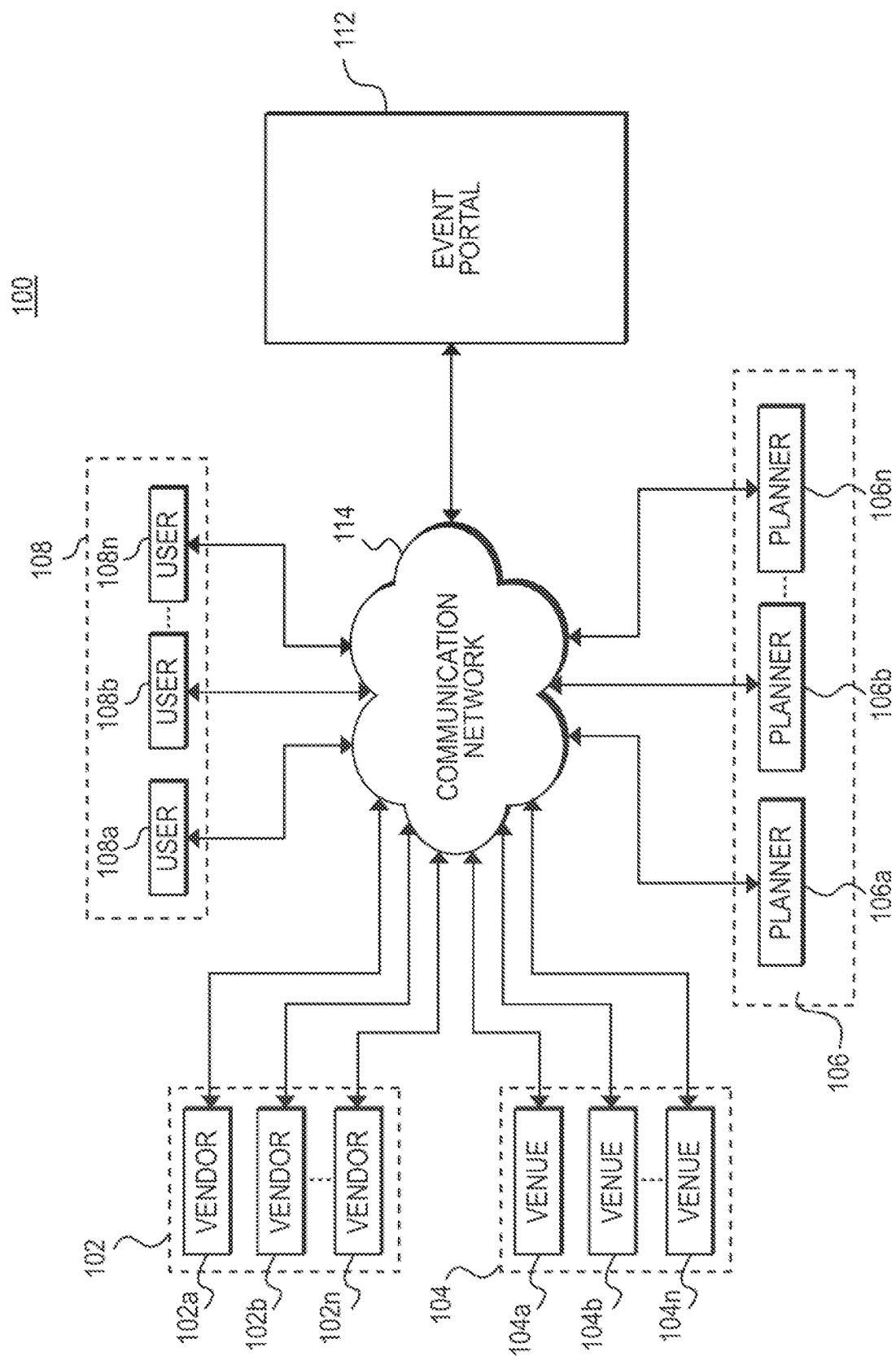
FIG. 1 illustrates an exemplary environment for facilitating event-planning, event-coordination, event-execution, procurement of products and services for events, and payments associated with each, consistent with the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations, and other implementations are possible, without departing from the scope and spirit of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Systems and methods consistent with the invention generally relate to event-planning, event-coordination, event-execution, procurement of products and services for events, and payments associated with each. Such events may include weddings, conferences, symposiums, seminars, trade shows, golf tournaments, press conferences, award ceremonies, bar and bat mitzvahs, meetings, nationwide product-launch parties, and other events where multiple vendors offer their products or services to attendees. Events may occur once or consist of a series of related events occurring in various geographic locations.

In general, a system is provided, including a central facility, or "portal," for finding, planning, selecting, scheduling, paying for, rating, or tracking products and services needed to provide successful execution of an event. In embodiments consistent with the invention, individuals acting on their own behalf or on behalf of a business entity potentially or actually participating in the meeting and event industry may interact, such as by accessing a web portal using a web browser on a computing device. These participants may include event planners, vendors, venues, and others interested in a particular event.

Potential participants may be required to register to become a "member" before being granted access to the portal. Registration may include supplying information and/ or paying a fee. The system may impose requirements such as evidence of financial stability before granting membership. Based on the type of their membership, members may obtain access to various features of the system. For example, if a member wishes to be the planner of an event, or "host," the member may pay a particular membership fee and have the capability to create their own member profile or page in a member directory, have access to a member directory, and view associated members' ratings. This may assist the host in finding or selecting desirable and reliable vendors for particular products and services for the event.

Members may list events on the portal. Once an event is listed, planners, vendors, and venues may market themselves by requesting to be selected to play their respective roles before, during, and after the event. Of the requests received, the listing member may select a host of the event. Alternatively, a planner may be a member who lists the event on the system and thus is designated the host of the event by default. For example, if a bride (non-member) selects an event planner (who is a member) to plan her wedding, the event planner may list the wedding on the portal and may be designated the host of the event without having to otherwise be selected by the system. Additionally, the portal may facilitate members in collaborating with other members to obtain, select, confirm, or otherwise communicate about products, services, and/or venues related to an event.

The host may then provide event information to the system. This information may include the event's date(s), time(s), location(s), and other information related to the event. The host may also issue a Request for Proposals, or RFP, to invite vendors, venues, and users to submit proposals in an attempt to be selected to supply their products or services before, during, or after the event.

Figure 6:
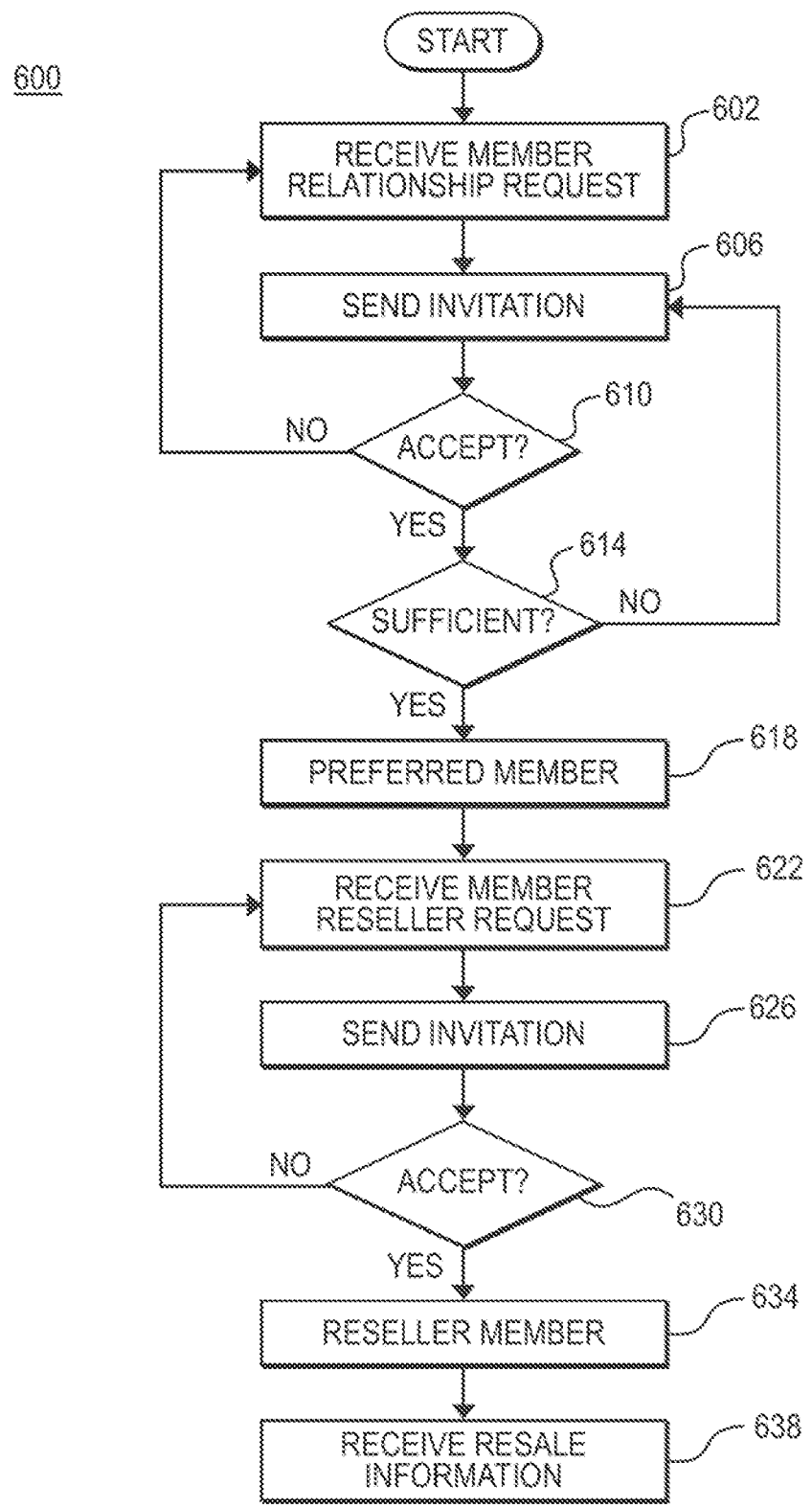
FIG. 6 is a flowchart of an exemplary method for members to establish preferred relationships with other members, consistent with the present invention.

Vendors who become aware of the event either through notifications, their own research, or some other means, may submit a proposal in response to the RFP. Proposals may include information related to products and services offered by the member. Additionally, proposals may include information related to products and services offered by preferred members, as described below in relationship method 600 (FIG. 6). Member vendors who submit a proposal, or bid, may be designated as "candidate" vendors.

The host may limit the types of vendors who may view event information or submit a proposal. Hosts may reveal information related to an event to only select members. Alternatively, hosts may reveal information to several and/or all other members. For example, a host of a funeral may not want to receive any proposals from entertainers. Similarly, venues that become aware of the event either through notifications, their own research, or some other means, may submit a proposal to serve as a location of the event. A host may similarly limit the types of venues that may view event information or submit a proposal. For example, the host for a large meeting may not want to display event information or receive a proposal from venues that are either in a different city or that do not have the capacity to seat the expected number of attendees.

Of the proposals submitted, the host may select one or more vendors and venues. Alternatively, if the venue is predetermined, the host may not accept proposals from other venues. Additionally, if the host is comfortable working with only a particular vendor for a particular product or service, the host may choose not to accept proposals from competing vendors for that particular product or service. The candidate vendors selected by the host to participate in the event may be designated as "selected" vendors.

Embodiments consistent with the invention may allow hosts or venues to impose certain venue-related requirements. These requirements may include vendor insurance requirements, access limitations, and other requirements. These requirements may be displayed on the system and made available to vendors, planners, and other users before or after the host has selected vendors. Alternatively, vendors may be exempt from one or more insurance requirements. Hosts or venues may, for example, selectively waive insurance requirements for a vendor. Vendors not meeting the requirements may not be permitted to view event information or submit a proposal. Alternatively, vendors not meeting requirements may be permitted to view event information or submit a proposal, with an opportunity to meet the requirements at a later time.

Once a vendor is selected by a host to provide one or more products or services, the vendor may be required to provide proof of insurance. For example, the selected venue may require a vendor to carry a certain amount each of vehicle, general liability, umbrella, and workers' compensation insurance. The vendor may be allowed to scan a copy of proof of insurance and transmit a digital image of the scan to the system. Alternatively, the vendor may be allowed to physically supply a copy of proof of insurance to the host or venue for viewing or certifying.

The system may compare the proof of insurance of vendors to the insurance requirements of the venue. The comparison may be done automatically or manually. If a vendor is found to carry sufficient insurance, the vendor may participate in the event as an "authorized" vendor. Alternatively, if the vendor is found to not carry sufficient insurance, the vendor may be so informed, to enable the vendor to obtain the proper amount of insurance and later provide proof of insurance. The new or modified proof of insurance may be compared to the insurance requirements of the venue. If the vendor is found to carry sufficient insurance, the vendor may participate in the event as an authorized vendor. If the vendor is still found to not carry sufficient insurance, the cycle may repeat until the vendor provides sufficient proof of insurance.

A member vendor may require access to one or more areas of the venue before, during, or after the event. For example, such areas may include loading docks, dressing rooms, kitchens, driveways, banquet rooms, hallways, parking garages/lots, freight elevators, lobbies, stages, or any other area or space associated with the venue. Embodiments consistent with this invention may enable improved security at the venue, particularly if various contractors, employees, or other associates of various vendors wish to access various areas of the venue at various times. Authorized or candidate vendors may request to access an area of the venue for a particular day or time. The venue or host may manage this access on the system and grant such requests. Alternatively, vendors may reserve a time to use an area of the venue on a first-come first-served basis.

The system may transmit information to permit the vendors to print coded identification cards, such as security badges or access badges, before arriving at the venue. The system may restrict how often identification cards may be printed and/or scanned. The system may also allow permanent badges to be created and used repeatedly. These identification cards may be scanned when the vendor arrives at or leaves the venue, and the scanned data may be collected by the system. The scanning of identification cards may additionally be used as a time-stamp in the system to record when a vendor enters or leaves the venue. The time-stamp may be used to track the vendor's movement in one or more areas of the venue. The time-stamp may be used, for example, to notify a host that a florist has arrived at the venue to deliver table centerpieces. The scanning of identification cards may also allow the vendor to receive special treatment based on the coded information. Such special treatment may include, for example, meal privileges and access to reserved and/or private areas of a venue.

Additionally, the venue may also scan a government-issued identification card to provide further identification verification. Such government-issued identification cards may include, for example, driver's licenses, passports, state identification cards, voter registration cards, or any other form of identification issued by the federal, state, or local government. Alternatively, the venue may scan another form of identification acceptable to the venue. The venue may choose to specify alternative or additional identification verification and forms of identification to be presented by vendors and their various contractors, employees, or other associates to obtain access. A computing device may be provided at the venue for tasks associated with the scanning of identification cards and otherwise tracking the movement of vendors within the venue.

Embodiments consistent with the present invention may also serve as a marketplace where members may find, rate, pay, collaborate with, or otherwise interact with other members. Members may create a file, such as a personal profile on the system. For example, members may create a webpage that describes the products and services they offer. Additionally, vendors may post materials to help market their products and services. Such marketing information may include, for example, certifications, photographs, videos, and audio files. Members may also request reviews of others' experiences with the products and services they offer, and may publish these reviews in their personal profile. These profiles may be organized into a collection. For example, the profiles may be displayed in a member directory. The system may allow members to view the member directory. Members may also selectively view profiles in the member directory. Planners, for example, may filter the venues and/or vendors they wish to view or otherwise interact with, based on criteria that they determine. Such criteria may include, for example, geographic location(s), the types of products and services offered, and the quality of reviews received from other members.

Additionally, members may establish preferred relationships with other members. Such relationships may allow members to sell products and services offered by other members. Additionally, preferred relationships may allow members to include products and services offered by other members in proposals they submit in response to RFPs. Such preferred relationships may allow, for example, members to offer products and services of other members at a discount. For example, an event planner may establish a preferred relationship with a florist, one that allows for a 20% discount from the florist's standard pricing. Additionally, preferred relationships may allow members to establish business terms under which to conduct business. For example, instead of negotiating and signing a new contract for every event, the terms of the preferred relationship may establish agreed-upon terms and conditions between the two members for an ongoing business relationship.

FIG. 1 illustrates an exemplary environment 100 for event-planning, event-coordination, event-execution, procurement of products and services for events, and payments associated with each, consistent with the invention. As shown, environment 100 may include nodes, such as vendor nodes 102, venue nodes 104, planner nodes 106, and user nodes 108. Environment 100 also includes an event portal 112. Communication among the vendor nodes 102, venue nodes 104, planner nodes 106, user nodes 108, and event portal 112 occurs over a communication network 114. Vendor nodes 102 may include one or more individual vendors 102a, 102b, . . . 102n. Venue nodes 104 may include one or more individual venues 104a, 104b, . . . 104n. Planner nodes 106 may include one or more individual planners 106a, 106b, . . . 106n. User nodes 108 may include one or more individual users 108a, 108b, . . . 108n.

Vendor nodes 102, venue nodes 104, planner nodes 106, user nodes 108, and portal 112 may comprise one or more computing devices, such as personal computers, desktop computers, laptop computers, handheld computing devices, mobile telephones, personal digital assistants (PDAs), servers (distributed server system), digital pens, scanners, or other types of computing devices known in the art. Such devices may include a processor (e.g., a central processing unit ("CPU")), a memory (e.g., RAM, ROM, etc.), a modem or other network communication interface, a user input device (e.g., keyboard, mouse, etc.), an output device (e.g., display, printing, etc.), an internal storage device (e.g., hard drive), an external storage device (e.g., database on external servers, disk, flash memory, etc.), and/or any other computing elements necessary for processing and communicating data.

Network 114 may include one or more network types, such as a wide-area network (WAN), a local-area network (LAN), the Internet, or any other type of communication network known in the art. Network 114 may operate by wireline and/or wireless techniques and may use transmission control protocol/internet protocol ("TCP/IP") or any other appropriate protocol to facilitate communication between nodes 102, 104, 106, 108, and portal 112 of environment 100. Network connections between the nodes of environment 100 may be established via Ethernet, telephone line, cellular channels, or other transmission media. Processors employed in embodiments consistent with the present invention may execute software written in a number of computer languages including, but not limited to, C, C++, C#, Basic, Visual Basic, Fortran, Cobol, SmallTalk, Java, Perl, HTML, XML, and other programming languages. Systems consistent with the invention may also be used with various standards, for example, the Java 2 Enterprise Edition™ ("J2EE") standard and/or the Microsoft .NET standard.

Vendor nodes 102 may include one or more computing devices associated with business entities potentially or actually providing products or services to the meeting and event industry. Vendor nodes 102 may additionally include one or more computing devices associated with contractors, employees, or other associates of a business entity potentially or actually providing products or services to the meeting and event industry. Vendor nodes 102 may interact with venue nodes 104, planner nodes 106, user nodes 108, and portal 112 via network 114 to communicate information, such as marketing information, guest information, budget information, bidding information, delivery information, venue requirements information, arrival information, departure information, identification information, and other information related to event-planning, event-coordination, event-execution, procurement of products and services for events, and payments associated with each.

Venue nodes 104 may include one or more computing devices associated with business entities potentially or actually hosting an event. Such entities may include, for example, hotels, city convention centers, conference centers, houses, clubhouses, public buildings, restaurants, or any other building or space that may serve as the physical location of an event. The event may alternatively be hosted in a "virtual" location. Venue nodes 104 may additionally include one or more computing devices associated with contractors, employees, or other associates of a business entity potentially or actually hosting an event. Venue nodes 104 may interact with vendor nodes 102, planner nodes 106, user nodes 108, and portal 112 over network 114 to communicate event information related to event-planning, event-coordination, event-execution, procurement of products and services for events, and payments associated with each, as set forth above.

Planner nodes 106 may include one or more computing devices associated with business entities potentially or actually planning or coordinating an event. Such entities may include, for example, event planners, meeting planners, wedding planners, brides, convention planners, conference organizers, destination management companies (DMCs), value-added resellers (VARs), and other individuals or groups of individuals that play a role in the planning, coordination, and execution of an event. These entities may vary in size and geographic reach, from solo practitioners to large corporations that have significant business segments dedicated to event planning. For example, a large pharmaceutical manufacturer may have in-house staff dedicated to planning events.

Planner nodes 106 may additionally include one or more computing devices associated with contractors, employees, or other associates of a business entity potentially or actually planning or coordinating an event. Planner nodes 106 may interact with vendor nodes 102, venue nodes 104, user nodes 108, and portal 112 over network 114 to communicate event information related to event-planning, event-coordination, event-execution, procurement of products and services for events, and payments associated with each, as set forth above.

User nodes 108 may include one or more computing devices associated with business entities potentially or actually accessing or communicating within environment 100 in other ways. Such entities may include, for example, web administrators, event administrators, marketplace administrators, convention center directors, hotel catering managers, hotel security officers, individuals seeking event updates, brides, grooms, corporations, and attendees. User nodes 108 may additionally include one or more computing devices associated with contractors, employees, or other associates of a business entity potentially or actually accessing or communicating within environment 100. User nodes 108 may interact with vendor nodes 102, venue nodes 104, planner nodes 106, and portal 112 over network 114 to communicate event information related to event-planning, event-coordination, event-execution, procurement of products and services for events, and payments associated with each, as set forth above.

Portal 112 may include one or more computing devices associated with business entities potentially or actually communicating, storing, presenting, or processing the information communicated within environment 100. For example, portal 112 may comprise a personal computer, a mainframe computer, or any other server computing device known in the art. The server may host a website. Portal 112 may be, for example, a web server, or any other type of computing device or system capable of performing the functions described herein. Portal 112 may interact with vendor nodes 102, venue nodes 104, planner nodes 106, and user nodes 108 over network 114 to communicate event information related to event-planning, event-coordination, event-execution, procurement of products and services for events, and payments associated with each, as set forth above.

Although environment 100 is described as having particular components arranged in a particular manner, one skilled in the art will appreciate that environment 100 may include additional or fewer components that may be arranged differently. For example, environment 100 may be implemented with a plurality of portals 112 and/or no user nodes 108.

Figure 2:
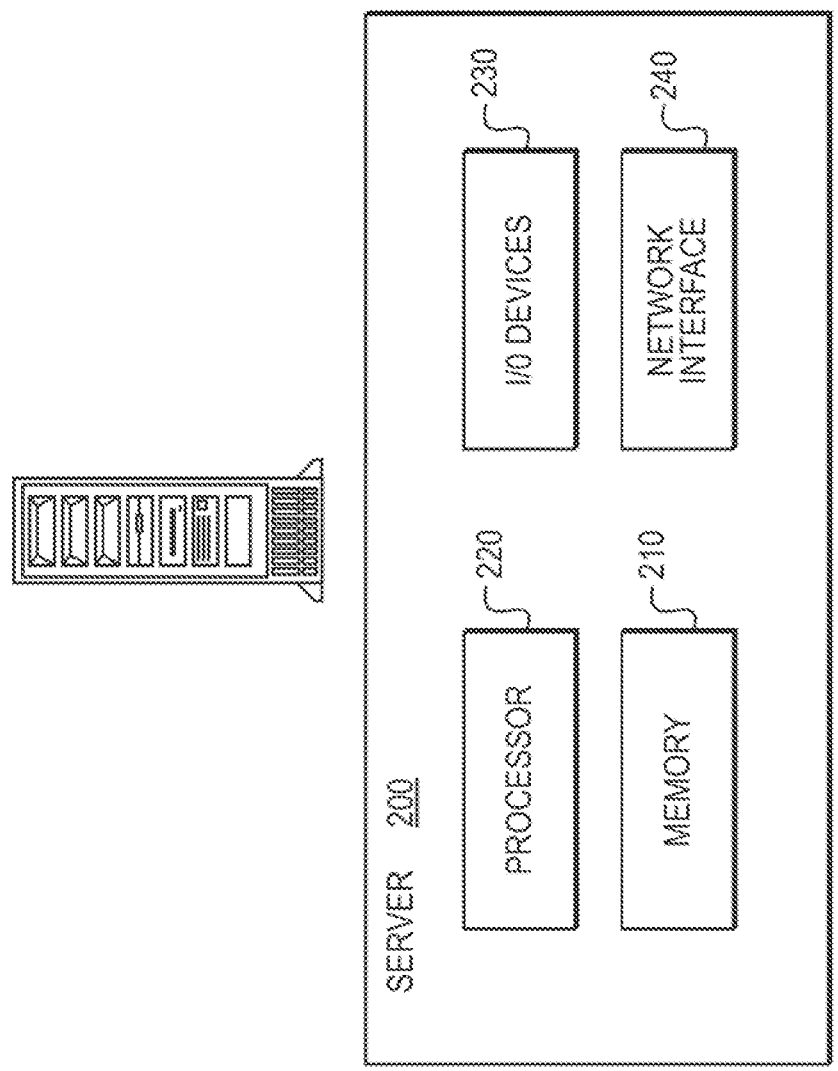
FIG. 2 shows exemplary components and information that may be associated with a portal in the event management system of FIG. 1, consistent with the present invention.

FIG. 2 is a representation of the components and information of portal 112 in further detail. A server 200 may comprise a personal computer, a mainframe computer, or any other server computing device known in the art. Server 200 may be, for example, a server hosting a website. Server 200 may include a memory 210, a processor 220, input/output devices 230, and/or a network interface 240 for communicating on network 114.

As shown, memory 210 may store an operating system, such as DOS, Windows, Mac OS X, or Linux. Memory 210 may also store one or more application programs, such as word processing, database programs, spreadsheet programs, presentation programs, and graphics programs, or other programs capable of generating documents, emails, alerts, notifications, or other electronic content. Memory 210 may also include web server applications capable of rendering standard Internet content in the form of web pages, accessible by client browsers, such as Netscape Navigator, Microsoft Internet Explorer, or Mozilla Firefox. Memory 210 may be used to store instructions, forming application programs which may be executed by processor 220 to cause server 200 to implement the functions of portal 112.

Input/output devices 230 may include one or more components allowing preparation, modification, or operation of portal 112. For example, input/output devices 230 may include user input devices such as a keyboard, a keypad, a mouse, a touch pad, a touch screen, a microphone, an accelerometer, or any other user input device known in the art. Input/output devices 230 may also include output devices such as a display (e.g., an LCD, a CRT display, or a plasma display), a printer, a speaker, or any other output device known in the art.

Network interface 240 may comprise any communication device for sending and receiving data. Network interface 240 may include, for example, a modem, a transceiver, a set-top box, a network communication card, a satellite dish, an antenna, or another network adapter capable of transmitting and receiving data over network 114.

Server 200 may respond to requests from vendor nodes 102, venue nodes 104, planner nodes 106, or user nodes 108 received from network 114 in connection with embodiments consistent with the present invention. It is noted that server 200 may comprise a single server computer or a collection of server computers, alone or in combination with other components. Server 200 may, for example, be part of a distributed server network (not shown) and may distribute data for parallel processing to one or more additional servers on the distributed network.

Figure 3:
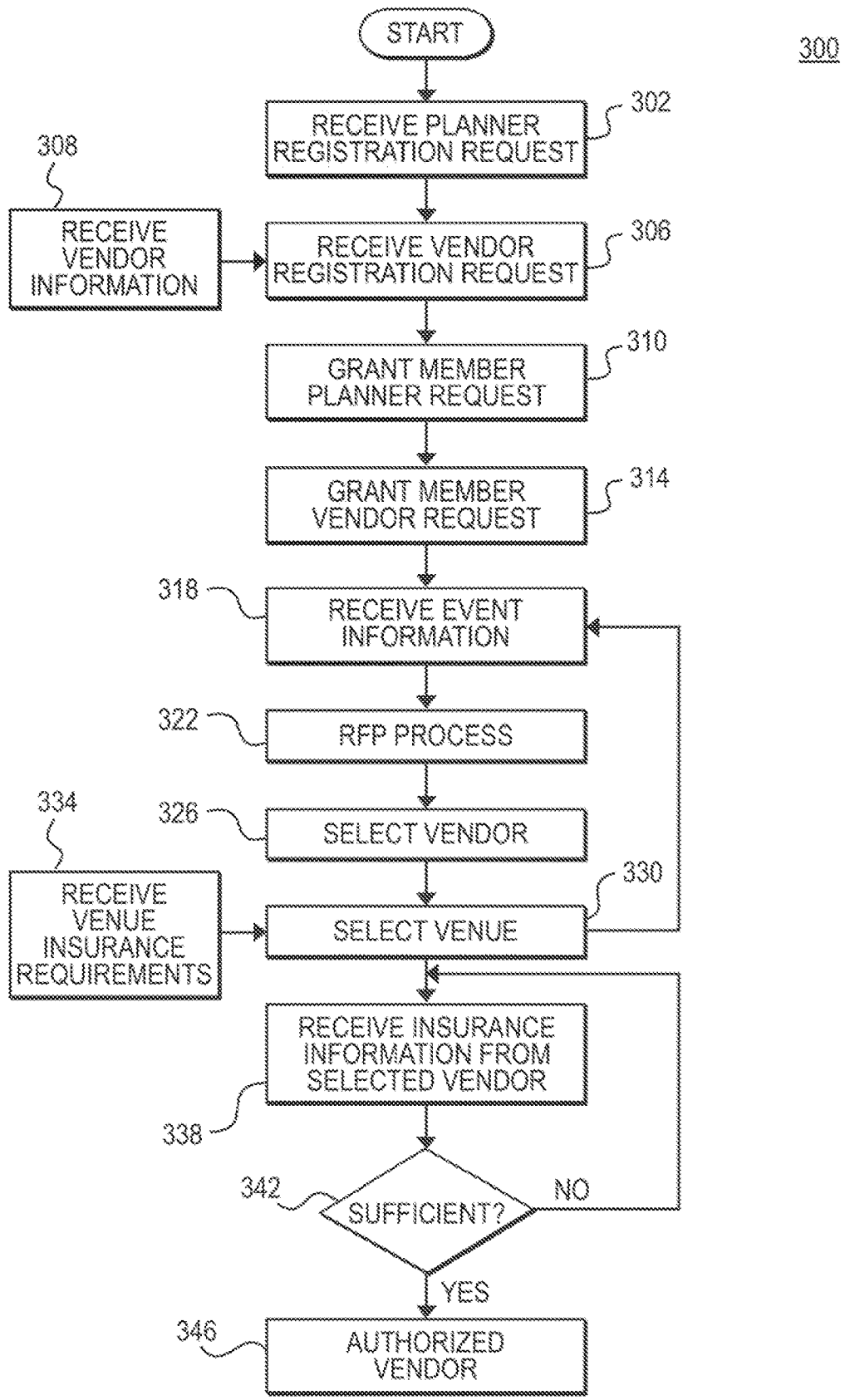
FIG. 3 is a flowchart of an exemplary method for authorizing members to participate in an event, consistent with the present invention.

FIG. 3 is a flowchart of an exemplary method, which may be performed by portal 112, for authorizing members to participate in an event. Member authorization method 300 may be performed, for example, separately for each event. Alternatively, method 300 may be performed for a collection of events, some or all of which are managed in portal 112. Additionally, method 300 may be performed periodically.

In step 302, portal 112 may receive a request from planners 106 to become a member planner. Without registering, planners 106 may not be permitted to navigate, view, display, bid, track, administer, submit, store, exchange, and/or otherwise access the information exchanged or stored in environment 100. For example, planners 106 may become a member through a website implemented in portal 112 by providing information such as their name, company name, company address, contact information, billing address, credit card information, banking information, the types of products or services they provide, and/or additional information that may help to create a unique identity within environment 100.

In step 306, portal 112 may similarly receive a request from vendors 102 to become a member vendor. Without registering, vendors 102 may not be permitted to access the information in environment 100, as set forth above. For example, vendors 102 may be permitted to become a member by providing unique information, as set forth above.

Similar to steps 302 and 306, portal 112 may additionally receive a request from venues 104 to become a member venue. Portal 112 may additionally receive a request from users 108 to become a member user. Without registering, venues 104 and users 108 may not be permitted to access the event information in environment 100, as set forth above. For example, venues 104 or users 108 may be permitted to become members by providing unique information, as set forth above.

Vendors 102 may provide background information related to their business. In step 308, portal 112 may receive information related to the business(es) of vendors 102, including the types of products and services they offer and the geographic area(s) where the products and services are offered. Portal 112 may also receive information related to preferences. The geographic areas may be organized or identified through the use of postal codes such as ZIP Codes™. Vendors 102 may also provide lists of the products and services offered, including wholesale and/or suggested retail pricing. For example, a product list may include stock-keeping unit (SKU) numbers, product descriptions, photos, videos, audio content, and other information that describes the products and services listed. Note also that step 308 may additionally occur after and/or in parallel with step 314. In such a scenario, vendors 102 may update their information as it changes.

In step 310, portal 112 may respond to step 302 and grant one or more of the planner requests, designating one or more planners 106 as member planners, to have access to portal 112. Registration, and thus access, may be granted when a membership fee is paid. The membership fee may grant registration, and thus access, to planners 106 for only a limited time and/or a limited scope. For example, planners 106 may pay a membership fee that may allow access for 30 days, 1 year, or 3 years. To avoid being later denied access to portal 112, planners 106 may be given the option to automatically renew membership. In order to permit this option, planners 106 may have to agree to allow a membership fee to be later-charged to the billing information that was entered in step 302.

Additionally, different membership fees may allow planners 106 to participate in and/or view information related to only a subset of the events managed in portal 112. For example, certain membership fees may allow planners 106 to list events, generate coupon codes, enter insurance information, add and edit user information, and edit user profiles or pages, while other membership fees may allow more or fewer capabilities. Alternatively, registration may be granted for free for planner requests. Registration may also be granted for free for a limited period of time, or trial period, to planner requests accompanied by a coupon. The coupon may be a trial code, a discount code, or an otherwise secret and personal identifier.

Notifications may be delivered to planners 106 near the end of the free registration period as a reminder to pay a membership fee that allows access as set forth above. Additionally, planners 106 may be given the opportunity to upgrade membership during the trial period. Member planners 106 may be given unique usernames, identifications, login passwords, and/or registration numbers that may allow access to portal 112.

In step 314, portal 112 may respond to step 306 and grant one or more of the vendor requests, designating one or more vendors 102 as member vendors, to have access to portal 112. Registration, and thus access, may be granted when a membership fee is paid or waived, as set forth above. Additionally, different membership fees may allow vendors 102 to participate in, bid on, and/or view information related to only a subset of the events managed in portal 112. For example, certain membership fees may allow vendors 102 to submit bids for events, list events, generate coupon codes, enter insurance information, add and edit user information, and edit user profiles, as described in FIG. 5. Alternatively, other membership fees may allow more or fewer capabilities. Registration may also be granted for free for vendor requests. Registration may also be granted for free for a limited period of time to vendor requests accompanied by a coupon, as set forth above. The coupon may be provided by any of vendors 102, venues 104, planners 106, or users 108 to help offset all or some of the event fees for vendors 102.

Notifications may also be delivered to vendors 102 near the end of the free registration period as a reminder to pay a membership fee that allows access as set forth above. Member vendors 102 may be given unique usernames, identifications, login passwords, and/or registration numbers that may allow access to portal 112.

Similar to steps 310 and 314, portal 112 may additionally grant one or more of the venue requests, designating one or more venues 104 as member venues, to have access to portal 112, as set forth above. Portal 112 may additionally grant one or more of the user requests, designating one or more users 108 as member users, to have access to portal 112, as set forth above.

In step 318, portal 112 may receive information related to an event. Portal 112 may receive, for example, a designation of a member planner 106 as the host planner for the event. For example, a member bride may transmit to portal 112 a selection of a member planner 106 to be the host for her wedding. The host may be given the capability to make decisions related to the event managed in portal 112. The host may, for example, have the final authority in selecting vendors as described in step 326. Additionally, portal 112 may receive, from venues 104 or planners 106, event names, event dates, event times, event categories, event planner names, the intended attendees' names, or additional information related to the event. As a result of receiving this information, portal 112 may place the event on a calendar that may be viewed by vendors 102, venues 104, planners 106, or users 108. Portal 112 may selectively allow vendors 102, venues 104, planners 106, and/or users 108 to view the event or calendar information. Alternatively, vendors 102, venues 104, planners 106, and/or users 108 may invite other vendors 102, venues 104, planners 106, and/or users 108 to view or receive notifications related to one or more events.

In step 322, vendors 102, venues 104, planners 106, and/or users 108 may selectively send one or more RFPs related to an event to one or more vendors 102, venues 104, planners 106, and/or users 108 via portal 112. Alternatively, the event may be open to all vendors 102, venues 104, planners 106, and/or users 108 to submit proposals. The request may be related to one or more products or services related to the event.

Additionally in step 322, one or more vendors 102, venues 104, planners 106, and/or users 108 may reply to the RFP by submitting a proposal, the proposal and related information being received by portal 112. For example, the proposal may contain details about the products or services being offered, a quote for how much the vendor will charge for the products or services, attachments included with the proposal, and/or other information related to replying to an RFP related to an event. Alternatively, a proposal may be received from venues 104 and contain details about areas within venue 104 that may accommodate the event. Such details may include, for example, the availability of private dining rooms and menus from a restaurant venue. Additionally, multiple, competing proposals may be received from one or more vendors 102 in response to the RFP, offering identical or similar products or services for an event.

Figure 5:
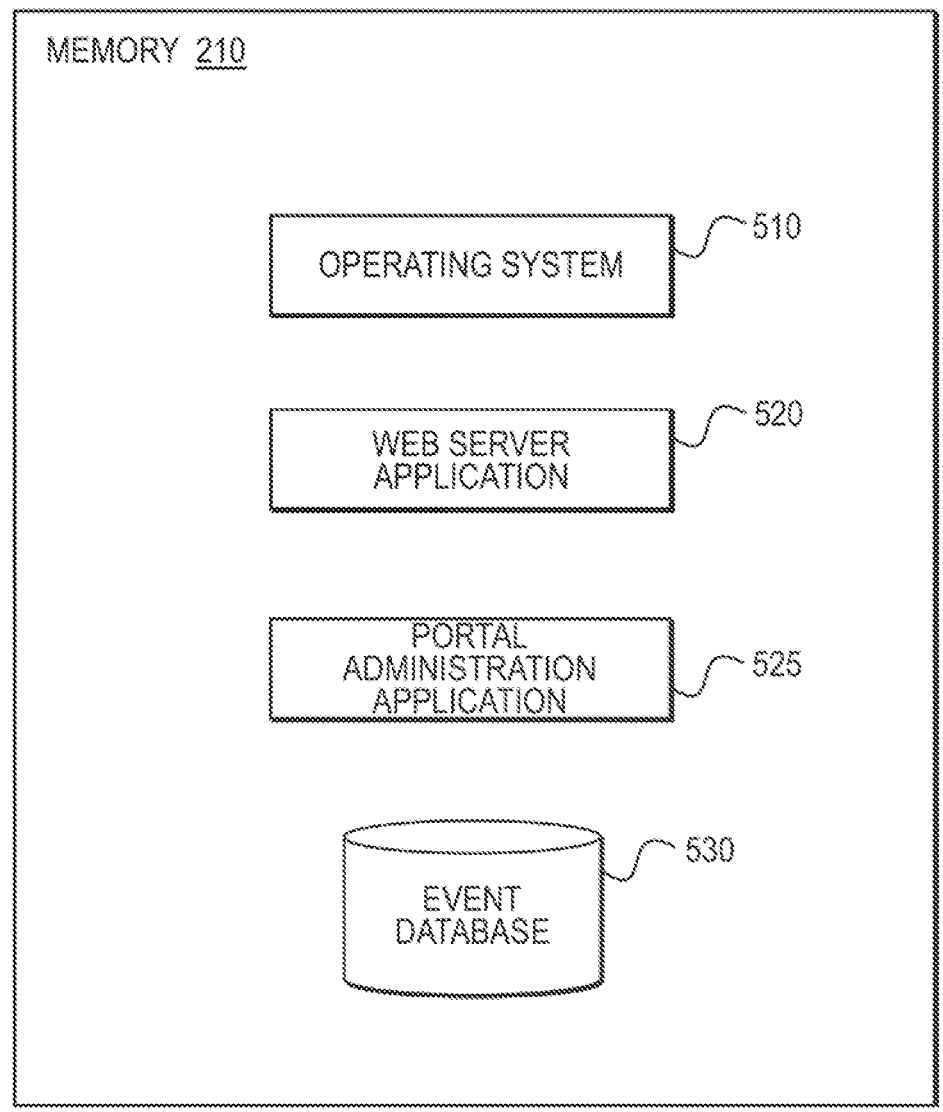
FIG. 5 shows exemplary components and information that may be stored in a memory of a server of FIG. 2, consistent with the present invention.

Proposals may be populated with additional information related to the responding vendors 102, venues 104, planners 106, and/or users 108. Such information may include, for example, terms and conditions associated with the proposal, logos, marketing information, and other information related to submitting a proposal in response to an RFP. This information may be stored in event database 530 (FIG. 5). Additionally, venues 104 and DMCs may populate proposals with general destination information related to the geographic location of the event venue. Such destination information may include, for example, photographs of local attractions, lists of nearby restaurants, and other information that may assist hosts in deciding where to hold an event. The destination information may also be provided to attendees of an event. This information may be stored in event database 530 (FIG. 5).

Additionally, members may include products and services offered by other members in their proposal. A member may include products and services of a preferred and/or reseller member, as explained below in relationship method 600. Alternatively, a member may similarly create another RFP identifying the products and services of other members that the member would like to include in their proposal. Planners 106, for example, may want to provide a package deal that may include several products and services provided by one or more vendors 102, in submitting a proposal in response to an RFP. Portal 112 may send this additional RFP to another member. Based on the response to the additional RFP, the member may include products and services provided by another member. This process of including products and services offered by other members into a proposal may occur with the products or services of one or more members.

Portal 112 may store information and log communications related to step 322. Information received in step 322 may be displayed to the host of an event. Additionally, portal 112 may display to vendors 102, venues 104, planners 106, or users 108 a list of one or more of their respective replies to RFPs associated with one or more events, and information associated with and/or submitted with the replies. Member vendors 102 submitting proposals may alternatively be designated as candidate vendors. Additionally, member venues 104 submitting proposals may alternatively be designated as candidate venues.

In step 326, portal 112 may receive from a host one or more selections of vendors 102 for their products or services, in response to step 322. The host may select one or more vendors 102 as selected vendors 102. The criteria used to select vendors 102 may vary from event to event, or from planner to planner. For example, the host may select vendors 102 based on the lowest bid submitted with a proposal in step 322. Alternatively, the host may view reviews and ratings on member profiles of vendors 102 stored in portal 112 and select a vendor 102 based on other planners' experiences with and/or the reputation of vendor 102. Alternatively, the host may select vendors 102 based on a combination of the above selection criteria. Portal 112 may then generate and deliver purchase orders, invoices, or other information related to the acceptance of a proposal.

In step 330, portal 112 may receive from a host one or more selections of venues 104 for hosting an event. Before and/or after the selection of a venue 104, portal 112 may provide to venues 104 a mechanism to direct vendors 102 to any requirements that the venue 104 has established. For example, venues 104 may define access requirements, insurance requirements, fees, or other terms and conditions of the venue for hosting an event and/or for allowing vendors 102, planners 106, or users 108 access to venue 104.

Venues 104 may specify insurance requirements for vendors 102, associated with an event. In step 334, portal 112 may receive insurance requirements from venues 104. Venues 104 may specify a general, venue-specific minimum insurance amount that vendors 102 may be required to carry. Alternatively, venues 104 may specify particular insurance requirements in addition to the specific minimum amount. For example, venue 104 may require vendors 102 to carry $1,000,000 in general liability insurance. Alternatively, venue 104 may require vendors 102 to carry $250,000 for each of vehicle, general liability, umbrella, and workers' compensation insurance, and so forth.

In order for member vendors 102 to participate in an event, they may be required to provide information and/or supporting documentation regarding their vehicle, general liability, umbrella, workers' compensation, and/or other insurance, as explained in step 338. Candidate, selected, and/or authorized member vendors 102 may view or review such insurance requirements, provided by venues 104 in step 334. Additionally, venues 104 may modify insurance requirements at any time. When venues 104 modify insurance requirements, step 342, as described below, may be repeated.

Note also that steps 330 and 334 may additionally occur before and/or in parallel with step 318. In such a scenario, vendors 102 may view venue requirements or calculate costs, taxes, and other fees prior and/or subsequent to submitting a proposal in reply to an RFP.

In step 338, selected vendors 102 may be required to provide portal 112 with information and/or supporting documentation regarding their vehicle, general liability, umbrella, workers' compensation, and/or other insurance. Vendors 102 may transmit one or more insurance certificates to portal 112. For example, vendors 102 may provide portal 112 with a digital insurance certificate as proof that they carry insurance. Alternatively, vendors 102 may be allowed to scan a copy of proof of insurance and provide portal 112 with a digital image of the scan through, for example, an email submission. Vendors 102 may also be allowed to send a photocopy of proof of insurance to planners 106 or venues 104 for viewing, verifying, and/or certifying. Vendors 102 may be allowed to otherwise provide detailed insurance information.

Vendors 102 may be allowed to modify any insurance information they have submitted. Additionally, portal 112 may provide a service to certify that insurance information and/or digital insurance certificates provided by selected vendors 102 are authentic and/or accurate. Portal 112 may also provide a way to review, reverify, and/or recertify any insurance information modified by vendors 102. Portal 112 may also notify vendors 102 of upcoming insurance-coverage expirations.

Vendors 102 may already have provided proof of insurance in relation to another event managed in portal 112. If the proof of insurance had already been certified and/or verified by portal 112 and is still valid and/or sufficient, portal 112 may not require vendors 102 to provide additional proof of insurance. To facilitate this procedure, portal 112 may store insurance data and selectively provide access to this data to permit vendors 102 to manage or keep track of verified and unverified insurance certificates.

In step 342, portal 112 may determine whether selected vendors 102 carry sufficient insurance to meet the requirements of venues 104. Portal 112 may perform step 342 by comparing submitted certificates of vendors 102, as received in step 338, with the requirements of venues 104, as received in step 334. This comparison may be accomplished automatically and/or manually. For example, planners 106, venues 104, or users 108 may physically review and compare the amounts of insurance required by venues 104 and carried by vendors 102. Planners 106, venues 104, or users 108 may also review the insurance certificates submitted by vendors 102 for accuracy and appropriateness. Alternatively, the comparisons may be completed automatically.

If candidate vendors 102 are found to carry sufficient insurance to meet the insurance requirements of venue 104, portal 112 may proceed to step 346, where they are designated as authorized vendors. Otherwise, vendors 102 may be given an opportunity to update, delete, and/or modify one or more proofs of insurance. In such a situation, portal 112 may return to step 338. Additionally, if vendors 102 modify or otherwise change one or more proofs of insurance, portal 112 may return to step 338. Portal 112 may log any such submissions, changes, verifications, denials, modifications, or other details associated with proofs of insurance received from vendors 102.

Vendors 102 may view insurance details related to certificates they, or someone on their behalf, have uploaded, deleted, and or modified. For example, vendors 102 may filter such insurance details by the outcome of each verification process. Additionally, venues 104 or planners 106 may view, print, email, or otherwise organize insurance details of selected vendors 102. This may allow venues 104 or planners 106 to determine if one or more vendors 102 have outstanding insurance obligations. Alternatively, portal 112 may email or otherwise notify venues 104 or planners 106 if one or more vendors 102 have outstanding insurance obligations. This may give venues 104 and/or planners 106 an opportunity to select alternative vendors that meet the insurance requirements received in step 334. The same or similar notifications may be sent to vendors 102 as a reminder to update, delete, or modify one or more proofs of insurance.

Alternatively, one or more vendors 102 may be exempt from one or more insurance requirements of venue 104. For example, some vendors 102 may have no employees. If venue 104 allows a workers' compensation waiver, vendors 102 may accept the terms and/or conditions of the waiver. Additionally, if a vendor 102 does not own, maintain, or operate a vehicle, portal 112 may exempt that vendor from carrying vehicle insurance.

Alternatively, venues 104 may exclude selected vendors 102 or users 108 from being subjected to the insurance requirements, allowing them to be authorized despite not carrying sufficient insurance. If vendors 102 meets insurance requirements of venues 104 other than those for which vendors 102 are exempt, then portal 112 may proceed to step 346.

In step 346, portal 112 acknowledges that a candidate vendor 102 carries sufficient insurance to participate in an event at venue 104. A member vendor 102 who is a candidate, is selected, and/or carries sufficient insurance may be designated as an authorized vendor 102. Authorized vendors 102 may participate in the event, schedule times to use one or more areas of venue 104, and/or communicate over network 114 with other vendors 102, venues 104, planners 106, users 108, and portal 112 regarding the event. Portal 112 may allow one or more members to view insurance information of authorized vendors 102 in a member directory, stored and organized in event database 530 (FIG. 5).

Alternatively, portal 112 may automatically authorize member vendors 102, venues 104, planners 106, or users 108 at an earlier step and allow steps 338 and 342 to be fulfilled at a later time. This may allow, for example, vendors 102 to view and plan for the event while insurance details are finalized. The venue may require, however, that vendors 102 have proof of insurance verified and/or certified prior to physically entering venue 104

Figure 4:
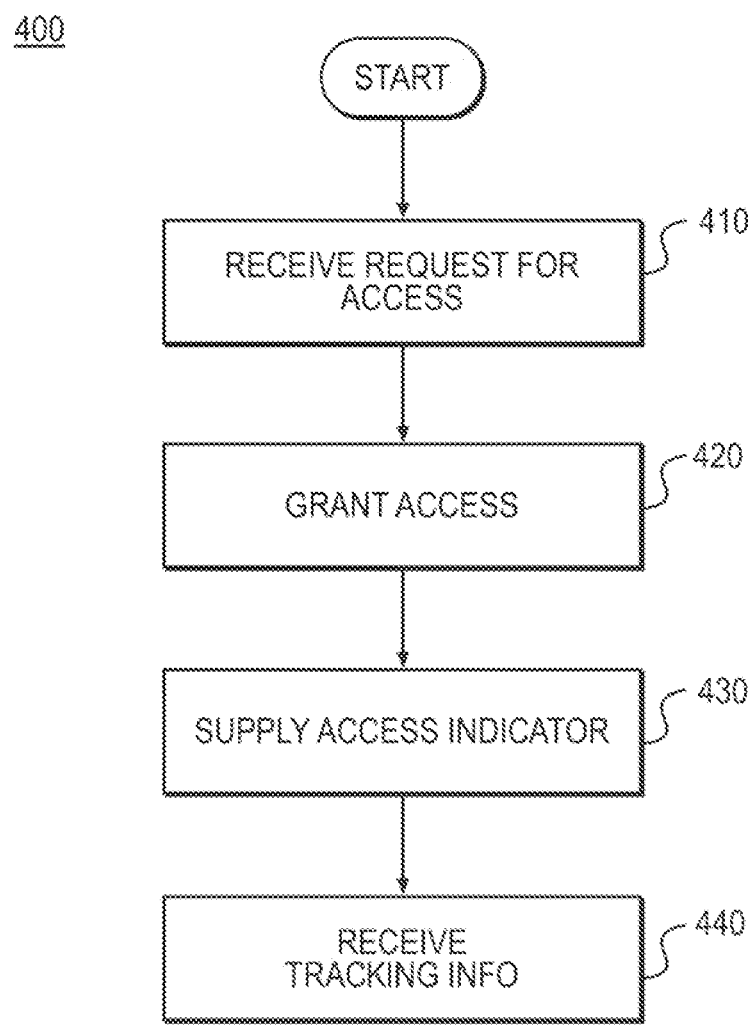
FIG. 4 is a flowchart of an exemplary method for tracking vendors that access an event venue, consistent with the present invention.

FIG. 4 is a flowchart of an exemplary method for tracking vendors that access an event venue, which may be performed and/or managed by portal 112. Tracking method 400 may be performed, for example, separately for each event. Alternatively, method 400 may be performed for tracking a collection of events, some or all of which are managed in portal 112.

In step 410, portal 112 may receive requests from candidate, selected, or authorized member vendors 102 or users 108 to obtain physical access to one or more areas of venues 104. The requests may contain specific details. For example, the requests may include descriptions of specific areas for which access is requested and the number or identifications of individuals that desire access to the area. The requests may further indicate the time, date, or total number of days on which vendors 102 desire access to venues 104. Additionally, the requests may further indicate the number of individuals needing access each day. Alternatively, requests may include a request for a plurality of access badges for an event.

Step 410 may be performed during the authorization process, at or after step 322 (FIG. 3). In this way, for example, when vendors 102 submit proposals, as in step 322, vendors 102 may determine how much in additional fees, if any, will be charged to obtain access to venues 104. This may assist vendors 102 to submit a more accurate bid for delivering products or services to an event. For example, vendor 102 may request one or more access indicators, as described in step 430 below. If venues 104 charge a fee for each indicator, vendors 102 may take into account the total fees for indicators before submitting a final proposal for an event. Alternatively, step 410 may be performed after step 346.

In step 420, portal 112 may respond to step 410 and grant one or more of the requests for access to one or more areas of venues 104. The requests may be granted automatically by portal 112 based on criteria received from venues 104. Portal 112 may not, for example, grant more than one request for access to an area of venue 104 for a particular time on a particular day. Alternatively, hosts or venues 104 may manually grant individual requests.

In step 430, portal 112 may supply indicators of access, as granted in step 420. Access indicators may include, for example, passes, access badges, person-specific badges, electronic key fobs, security tokens, and vehicle badges. Access indicators may contain a bar-code that may be scanned by a scanning device known in the art.

The access indicators may be physically delivered to vendors 102. Alternatively, the access indicators may be electronically delivered to, or retrieved from portal 112 by, vendors 102. For example, the requested indicators may be prepared and mailed to vendors 102. Alternatively, the requested indicators may be emailed to vendors 102, and vendors 102 may print the indicators prior to accessing venues 104. Additionally, vendors 102 may only be allowed to print or email printable indicators after sufficient payment is received or billing information is submitted. Such billing information may include, for example, coupon codes. Vendors 102 may be prohibited from printing the same indicator more than once.

Vendors 102 may further supply indicators for a specific day or a specific area of a specific venue to the appropriate people that will be accessing venues 104. The appropriate people may be contractors, employees, or other associates of vendors 102, venues 104, planners 106, or users 108. This may allow, for example, temporary employees of vendors 102 the ability to view and print the appropriate indicator for the appropriate day, without the temporary employee having to register with portal 112 and/or otherwise be a member. Additionally, the indicator may be scanned and allow successful entry into venues 104 only on the specific day for which it has been issued. Alternatively, if the indicator allows for access to venues 104 across multiple days, the indicator may be scanned and allow successful entry into venues 104 on any of the days for which the indicator allows access. Alternatively, multiple indicators may be required to be printed for access to venues 104 across multiple days, and one indicator may be scanned and allow successful entry into venue 104 on only one of the days for which the indicator allows access. A different indicator may be required to be scanned, for example with a different bar-code, on each separate day within the range of days for which vendors 102 have been granted access to venues 104.

In step 440, portal 112 may receive tracking information from scans of the access indicators. Access indicators may be scanned when vendors 102 enter and/or exit venues 104. For example, security guards at venues 104 may scan access indicators. If portal 112 recognizes an indicator as belonging to someone that has been granted access to one or more areas of venue 104, they may be allowed to enter. Alternatively, if the indicator is not one that portal 112 recognizes as allowing access to one or more areas of venue 104 at the particular date and/or time, then they may not be allowed to enter venue 104. Additionally, an indicator that has been scanned for entry into venue 104 may not be used again, other than to exit venue 104.

Additionally, venues 104 may scan government-issued identification of vendors 102 using any scanning device known in the art. The identification may complement an indicator and provide further identification verification. For example, an OCR scanner may be used to scan the identification, and the text may be converted to data that may be received by portal 112. Alternatively, a barcode scanner may be used to scan the identification's bar-code. Alternatively, a reader may be used to retrieve information stored on a magnetic stripe. Alternatively, a security guard may type the identification information of vendors 102 by hand into a computing device, and the information may be received by portal 112.

Portal 112 may generate signals to request that a contractor of vendors 102 come to venue 104 to address an issue. Alternatively, a contractor may be invited by venue 104 to enter and address an issue. The issue may arise with no advance notice, and the contractor will need access to venue 104 in a short amount of time. Thus, it may not be practical to require the contractor to register and be authorized to access venue 104 by portal 112. To track such unexpected visitors to venues 104, the use of a digital pen and/or pre-printed forms may allow the contractor to sign-in to venue 104. The contractor may be required to use a digital pen to complete a pre-printed form, and the writing data may be captured by the digital pen. For example, the form may require contractors to enter their name, the event name, event date, event time, check-in time, check-out time, and/or sign the form. The captured data may be received by portal 112. The completed form may also be used by the contractor as a temporary, physical badge for access to one or more areas of venue 104. Venues 104 may similarly allow access to one or more areas of venue 104 to individuals without an indicator or individuals who are not authorized, as they determine. Alternatively, vendors 102 may use access indicators supplied in step 430.

Some or all of the tracking data may be received by and/or stored in portal 112. Additionally, tracking data may be organized, summarized, or presented to vendors 102, venues 104, planners 106, or users 108. Additionally, tracking data may be supplied to vendors 102, venues 104, planners 106, or users 108. For example, tracking data may be viewed on a webpage of portal 112. Alternatively, tracking data may be sent by portal 112 as an email or notification to a computing device in environment 100.

FIG. 5 is a representation, in further detail, of the components and information that may be stored in server memory 210 (FIG. 2), consistent with the present invention. As shown, memory 210 may include an operating system 510, a web server application 520, a portal administration application 525, and an event database 530.

Web server application 520 may comprise one or more webpage-hosting and/or database-accessing applications configured to generate signals providing display of information on client browser applications. Event database 530 may contain vendor information, venue information, destination information, scheduling information, event information, insurance information, member information, access indicator information, RFP information, proposals information, membership information, permissions information, preferences information, coupon information, help information, marketing information, review information, ratings information, preferred-member relationship information, reseller relationship information, resale information, pricing information, discount information, payment information, purchase information, order information, invoice information, billing information, financial account information, negotiation information, notification information, geographic information, or other information related to event-planning, event-coordination, event-execution, procurement of products and services for events, and payments associated with events in portal 112. Additionally, event database 530 may contain log information associated with each of these.

Processor 220 (FIG. 2) may leverage and execute operating system 510, web server application 520, portal administration application 525, and/or event database 530 in portal 112. Portal administration application 525 may interact with web server application 520 and event database 530 to implement the described functions of portal 112.

Event database 530 may store information related to members in environment 100. A member directory may also be created in portal 112. The member directory may be a collection or organization of the member information stored in event database 530. Portal 112 may allow one or more members to view information regarding other members.

Members may be permitted to create a custom file, profile, page, entry, or other presentation of information within the member directory, with information about the products or services they offer. Members may enhance their profile in the directory by adding or displaying marketing materials. For example, if the directory is in the form of a web-directory, members may post links to videos, pictures, award logos, or other information that would help explain the products or services they offer. Additionally, portal 112 may provide default logos, art, or other information that may be useful to members in creating their directory profile.

Portal 112 may also allow vendors 102, venues 104, planners 106, or users 108 to request ratings and/or reviews of the products or services offered by the member. These requests may be directed to one or more vendors 102, venues 104, planners 106, and/or users 108. The requests may be delivered electronically, and the recipient may be notified electronically that a request has been delivered. Portal 112 may provide default wording to include with the request. Vendors 102, venues 104, planners 106, and/or users 108 may additionally provide wording to include with the request. Portal 112 may receive a request from vendor 102, for example, to send a request for a review to planner 106. The review may be related to the products or services delivered or provided by vendor 102 during an event. Planner 106 may submit a review to portal 112 in response to the request. Additionally, vendors 102 may request revisions of reviews in a similar manner. This information may be stored in event database 530.

The review may further include some type of rating. For example, planners 106 may award vendors 102 five stars, out of five possible, when planners 106 are extremely pleased with the products or services of vendors 102. Users 108 may also, for example, award planners 106 a rating of "1," out of "10" possible, when users 108 are extremely dissatisfied with the products or services of planners 106. Additionally, reviews may contain comments describing the performance of the review-requesting member. Information contained in reviews may be logged and/or stored in event database 530. Review-requesting members may view the information contained in the review. Portal 112 may receive such requests from vendors 102, venues 104, planners 106, or users 108. This information may be stored in event database 530.

Portal 112 may receive ratings associated with one member, from one or more other members. Portal 112 may calculate an average rating, based on all of the ratings submitted, for the particular member. Members may be permitted to post information from one or more such reviews to their profile in the member directory. This information may be stored in event database 530. The member directory may selectively allow members to view ratings, average of ratings, comments, and/or reviews associated with a member. Portal 112 may also selectively allow non-members to view ratings, average of ratings, comments, and/or reviews associated with a member. For example, a planner 106 may privately share comments about a particular vendor 102 with one or more other planners 106. Alternatively, a planner 106 may publically share comments about a particular vendor 102 with every other member.

Members may be permitted to modify their information. Vendors 102 or venues 104 may, for example, be permitted to modify their contact information, password, or other member-specific information. Members may also be permitted to modify which and/or how information is presented on their profile in the member directory.

Portal 112 may allow a member to selectively view information related to a subset of members in the member directory. The member may, for example, elect to view only hotel venues and not convention centers. Alternatively, the member may elect to view only florists and/or other vendors serving a particular geographic area and with a rating of four or five stars. Portal 112 may, for example, selectively display vendors that have particular ratings or provide particular products or services, as determined by the member. The member may also elect to only view information related to events for which they have been authorized.

Additionally, portal 112 may provide information to members so that they may more easily utilize the directory. For example, there may be information entitled "Help" that answers "Frequently Asked Questions" for members.

Portal 112 may organize information stored in event database 530 and allow members to print the information. For example, portal 112 may enable vendors 102 to print a receipt for the event. Portal 112 may also enable venues 104 to print a list of candidate or authorized member vendors for an event. Planners 106 may print summaries, for example, of fees received, transactions reports, monthly portal usage reports, existing listed event reports, or any reports, summaries, or other organization of the information stored in event database 530.

FIG. 6 is a flowchart of an exemplary method, which may be performed by portal 112, for a member to establish a preferred relationship with other members, which may be performed and/or managed by portal 112. Relationship method 600 may be performed, for example, for some or all of vendors 102, venues 104, planners 106, and users 108.

Portal 112 may allow members to selectively view information related to other members in the member directory stored in event database 530 (FIG. 5). Members may additionally want to establish a preferred relationship with other vendors. A preferred relationship may allow members to work in collaboration with each other. Additionally, a preferred relationship may allow one member to vouch for the quality or pricing of the products or services offered by another member. Further, portal 112 may enforce that employees of a member correspond only with another "preferred" member.

After viewing information related to other members in the member directory, a member may identify potential members with whom to establish a preferred relationship, or potential business partners. In step 602, portal 112 may receive requests from candidate, selected, or authorized members with information identifying the member planners 106, venues 104, users 108, or vendors 102 with whom they would like to establish a preferred relationship.

Additionally, relationship-requesting members may include information related to the preferred relationship. The included information may assist potential business partners in determining whether the preferred relationship is desirable and/or possible. Such information may include, for example, terms and conditions for being business partners, fees associated with the preferred relationship, insurance requirements, and other information related to becoming business partners. This information may be stored in event database 530 (FIG. 5). This information may also be included with step 606, as described below.

In step 606, portal 112 may send invitations for establishing a preferred relationship to potential business partners identified in step 602. Invitations may be sent automatically and/or manually. Invitations may also be sent electronically and/or physically. For example, vendors 102 may have specified their mailing address, and a preference for receiving information related to preferred relationships by mail, in step 308 (FIG. 3). Alternatively, if no such preferences exist, the invitation may be sent automatically as an email or notification after step 602. Portal 112 may allow potential business partners to solicit additional information from relationship-requesting members. Additionally, portal 112 may allow potential business partners to accept or reject the invitation.

In step 610, portal 112 may receive a response to the invitation from the potential business partner. If the response accepts the invitation, portal 112 may proceed to step 614. Otherwise, the relationship-requesting member may identify another potential business partner. In such a situation, portal 112 may return to step 602.

In step 614, portal 112 may determine whether potential business partners meet the information and requirements related to the preferred relationship. This information may be provided by the relationship-requesting member in step 602 and included with the invitation sent in step 606. Similar to step 342 (FIG. 3), the comparison performed in step 614 may be accomplished automatically and/or manually. For example, planners 106 requesting the preferred relationship may physically review and compare the amounts of insurance they require, to the amount carried by the potential business partner. Alternatively, the comparison may be completed automatically.

If potential business partners are found to meet the information and requirements of the relationship-requesting member, portal 112 may proceed to step 618, where they are designated as preferred members. For example, vendors 102 who, in step 610, accept an invitation to establish a preferred relationship and who meet the requirements and information related to the preferred relationship, as specified in step 602, may be designated as preferred vendors. Otherwise, potential business partners may be given an opportunity to update, delete, and/or modify information associated with their products, services, and other information related to the desirability and possibility of establishing a preferred relationship. In such a situation, portal 112 may return to step 606. Additionally, if the potential business partners modify or otherwise change any of their information, portal 112 may return to step 606. Portal 112 may log any such invitations, changes, verifications, denials, acceptances, modifications, or other information related to the desirability and possibility of establishing a preferred relationship.

In step 618, the potential business partner may be designated as a preferred member. A preferred member may, for example, benefit from favorable, pre-negotiated pricing, pre-negotiated terms & conditions, and a level of exclusivity between the two members.

In step 622, relationship-requesting members may additionally or alternatively request to be resellers for preferred members. A reseller may be authorized to incorporate a preferred member's products or services into a proposal submitted in step 322 (FIG. 3) without having to obtain additional permissions from the preferred member. Portal 112 may provide tools and content to allow such incorporation. A reseller may also be authorized to sell a preferred member's products or services. A relationship-requesting planner 106 may, for example, request to be a reseller in order to offer and sell products and services that a preferred vendor 102 listed, described, or otherwise submitted in step 308 (FIG. 3).

In step 626, portal 112 may send an invitation for establishing a reseller relationship to the preferred member identified in step 622. The invitation may be sent automatically and/or manually. The invitation may also be sent electronically and/or physically. For example, vendors 102 may have specified their mailing address, and a preference for receiving information related to reseller relationships by mail, in step 308 (FIG. 3). Alternatively, if no such preferences exist, the invitation may be sent automatically as an email or notification after step 622. Portal 112 may allow preferred members to solicit additional information from relationship-requesting members. Additionally, portal 112 may allow preferred members to accept or reject the invitation.

In step 630, portal 112 may receive a response to the request from the preferred member. If the response accepts the invitation, portal 112 may proceed to step 634. Otherwise, the relationship-requesting member may identify another preferred member. In such a situation, portal 112 may return to step 622. Alternatively, in such a situation, portal 112 may return to step 602.

In step 634, the relationship-requesting member may be designated as a reseller member. A reseller may be authorized to incorporate a preferred member's products or services into a proposal submitted in step 322 (FIG. 3) without having to obtain additional permissions from the preferred member. Additionally, a reseller may be authorized to incorporate a preferred member's products or services in ecommerce storefronts 700 (FIG. 7), as described below. A reseller may also be authorized to incorporate a preferred member's electronic material or electronic materials associated with the preferred member. Such electronic materials may include, for example, photographs, logos, and videos of the preferred member performing.

Preferred vendors 102, for example, may determine which products and services they would like to make available to relationship-requesting planner 106 for resale from among those listed, described, or otherwise submitted in step 308 (FIG. 3). In the same example, preferred vendors 102 and relationship-requesting planner 106 may negotiate the terms of the reseller relationship. Such terms, or information, may include, for example, discounts off the wholesale pricing published by preferred vendor 102, fees associated with the reseller relationship, charges associated with the reseller relationship, and other information related to reseller relationships. This information may be stored in event database 530 (FIG. 5).

In step 638, portal 112 may receive information from the relationship-requesting member related to the reseller relationship. Such information may include, for example, a retail price that the relationship-requesting member has assigned for the products and services associated with those negotiated in the reseller relationship. For example, once the members in the reseller relationship have agreed on a price for particular products and services, the relationship-requesting member may assign a higher retail price or make other changes to the preferred member's products and services in preparation for resale. This information may be stored in event database 530 (FIG. 5).

Figure 7:
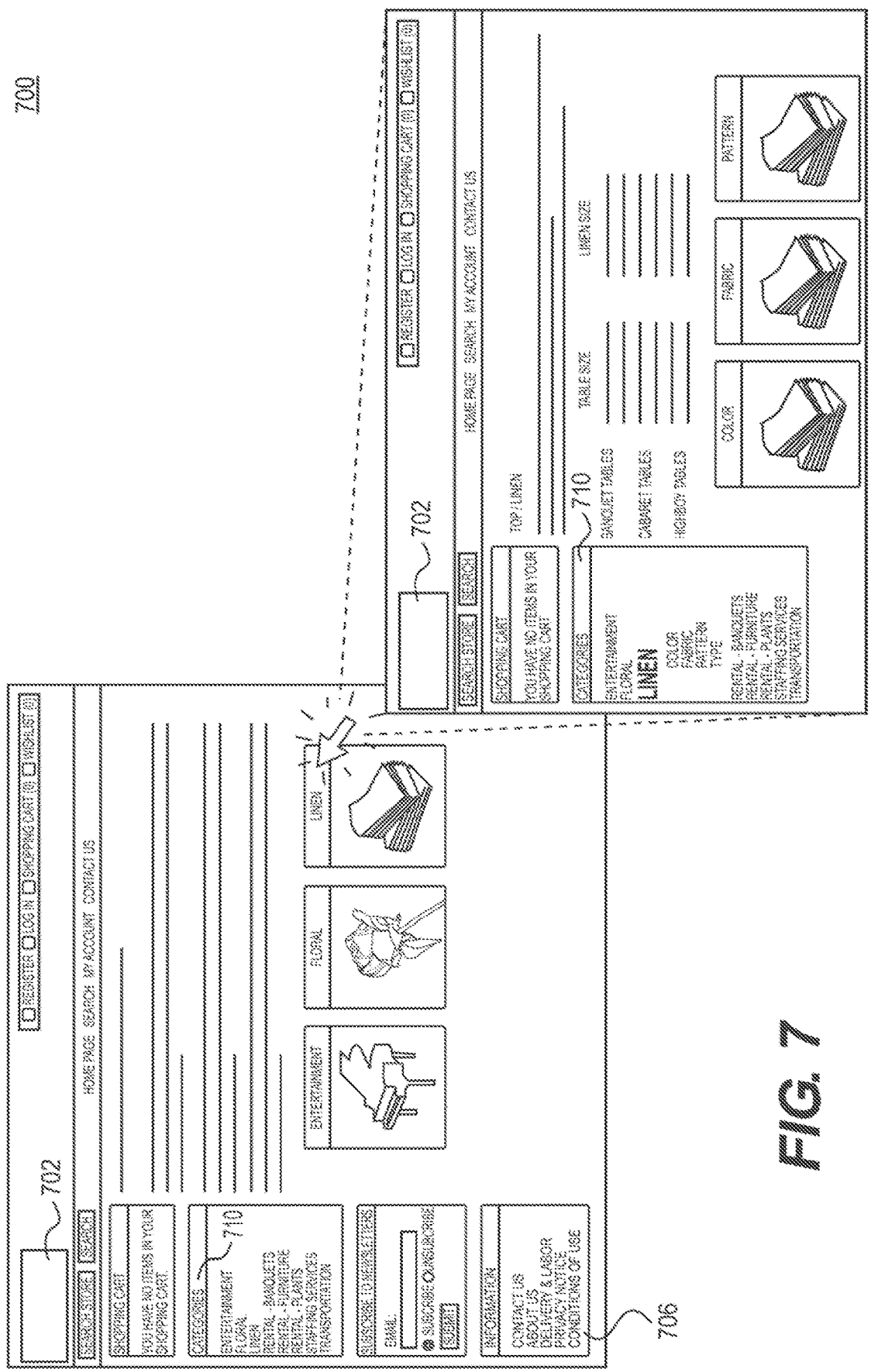
FIG. 7 shows exemplary components and information that may be displayed by a web server application of FIG. 5, consistent with the present invention.

FIG. 7 shows exemplary components and information that may be displayed by web server application 520 (FIG. 5), consistent with the present invention. As shown, web server application 520 may display an ecommerce storefront 700 that may allow reseller members to resell products and services, as outlined in step 634 (FIG. 6). This information may be displayed as a web page and/or user interfaces. Orders placed through storefront 700 may result in purchase orders generated, delivered, and paid for via payment method 800, as described below.

Portal 112 may provide reseller members ecommerce storefront templates. These storefront templates may be reused, from member-to-member or from storefront-to-storefront. The storefront templates may include additional information related to displaying storefront 700. Such information may include, for example, standard wording, logos, art, formatting specifications, layouts, and other information that may help reseller members create an ecommerce storefront. By selecting a storefront template, members may initiate the creation of a new ecommerce storefront in portal 112.

Reseller members may populate the selected storefront template with electronic artifacts. Such artifacts may include, for example, logos 702, terms & conditions 706, photographs, marketing information, products information, services information, pricing information, and other information that may assist reseller members in selling products and services for events. Logos 702 may identify the reseller member. Alternatively, logos 702 may identify other members or third-parties.

Portal 112 may selectively prompt reseller members to populate the selected storefront template with particular information. Such information may include, for example, identification of the geographic area(s) serviced by storefront 700. This may assist, for example, portal 112 in allowing members to selectively view information based on the geographic area(s) served by reseller members.

Reseller members may also identify products and services to make available in storefront 700 by selecting them or otherwise providing them to portal 112. Such products and services may include, for example, those negotiated and agreed-upon in steps 622 through 638 (FIG. 6).

Reseller members may organize or otherwise arrange products and services in storefront 700 by categorizing them into categories 710. Categories 710 may include a grouping of products and services by general identifying topics. Such groupings may include, for example, a category labeled "Linens" and contain information related to tablecloths, napkins, chair covers, and all other textile products. Alternatively, categories 710 may include packages of multiple products and services. Such packages may include, for example, a "Break-out Meeting Package" that contains some or all of rental projectors, free-standing rental projector screens, and free-standing paper easels.

Portal 112 may render information entered, provided, or otherwise supplied by reseller members in relation to storefront 700 in the form of web pages and/or user interfaces. Portal 112 may also make the web pages accessible by assigning a unique Uniform Resource Locator (URL).

Figure 8:
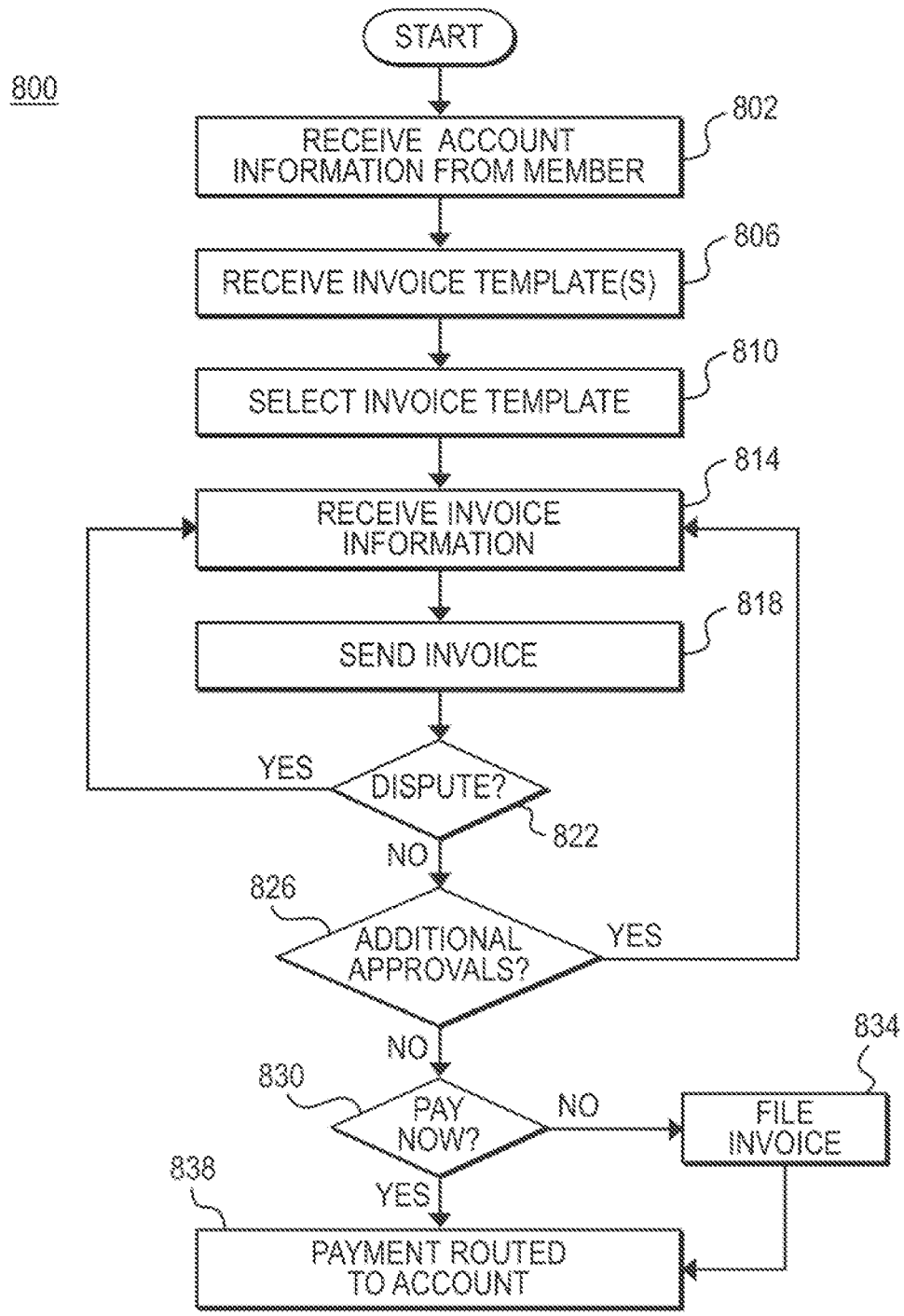
FIG. 8 is a flowchart of an exemplary method for members to make payments to other members, consistent with the present invention.

FIG. 8 is a flowchart of an exemplary method, which may be performed by portal 112, for members to make payments to other members. Payment method 800 may be performed, for example, separately for each transaction that occurs in portal 112. Alternatively, method 800 may be performed for a collection of transactions, some or all of which are managed in portal 112.

In step 802, portal 112 may receive financial account information from member vendors 102, venues 104, planners 106, or users 108. This information may facilitate payments between members. For example, member venues 104 may only accept direct deposits associated with rental payments for events. By entering financial account information, member venues 104 may obtain direct deposit payments via portal 112 without having to provide specific financial account information, such as routing and account numbers, to other members. Such financial account information may include, for example, bank account information, bank routing numbers, credit card information, automated clearing house information, and other information related to financial accounts. This information may be stored in event database 530 (FIG. 5).

In step 806, portal 112 may receive one or more invoice templates from member vendors 102, venues 104, planners 106, and users 108. These invoice templates may be reused, from event-to-event or from transaction-to-transaction, by the member. The invoice templates may include additional information related to payments. Such information may include, for example, standard wording, logos, formatting details, and other information that may stay consistent from invoice-to-invoice. For example, the invoice template may have language at the bottom which reflects the legal obligations of the recipient of the invoiced products and services and a standard due date, such as "due thirty days from receipt" or "five-percent discount for payments made within 15 days from receipt." This information may be stored in event database 530 (FIG. 5). This information may also be included with the invoice prepared in step 814, as described below.

In step 810, portal 112 may receive from members a selection of an invoice template from among the templates submitted in step 806. The selected invoice template may be used to create an invoice. The invoice may eventually be sent to the member who is required to make payments related to an event. Additionally, if portal 112 receives only one invoice template from the member, step 810 may be skipped.

In step 814, portal 112 may receive information related to an invoice from members preparing and creating the invoice. Such information may include, for example, details of the products and services provided for an event, details about the person and/or entity responsible for making the payment, details about the recipient(s) of the invoice, payment due date, details about the required approvals, and other information related to invoices. This information may be stored in event database 530 (FIG. 5). Portal 112 may prompt members to enter particular information, in a particular order. Alternatively, members may enter some and/or all of the information manually. Portal 112 may then generate or otherwise prepare the invoice.

Additionally, if the member creating the invoice later decides to use a different invoice template, portal 112 may return to step 810. Alternatively, if the member creating the invoice decides to use a different template before the invoice is created in step 814, information entered into the first-selected invoice template may be transferred to the later-selected invoice template.

In step 818, portal 112 may send the invoice to the member identified as the recipient of the invoice. Alternatively, portal 112 may send the invoice to a non-member recipient. The invoice may be delivered electronically, and the recipient member may be notified electronically that an invoice has been delivered with instructions on how the invoice may be retrieved.

Once the invoice is retrieved, the recipient member may take one or more actions related to the invoice. First, in step 822, portal 112 may determine if the recipient of the invoice has any questions or disputes related to the invoice. If the recipient has any questions or disputes related to the invoice, portal 112 may return to step 814 and send a summary of the questions and disputes to the member that created the invoice. After the recipient and creator of the invoice negotiate the contents of the invoice, portal 112 may return to step 814 and receive updated information related to the invoice from the member preparing and creating the invoice. If the invoice contents are negotiated via communications within environment 100, the communications may be logged and stored in event database 530 (FIG. 5). Alternatively, if there are no questions or disputes related to the invoice, portal 112 may proceed to step 826.

Certain invoices may require approval from a plurality of members. Some companies may, for example, require two approvals for paying invoices over a certain threshold amount. In step 826, portal 112 may determine if additional approvals are needed before proceeding to pay the invoice. Additionally, portal 112 may determine whose approvals are needed. In such a situation, portal 112 may return to step 814 and add the names of the additional approval members to the list of invoice recipients. Once all the appropriate approvals are received, portal 112 may proceed to step 830.

In step 830, portal 112 determines when the invoice needs to be paid. If portal 112 determines that the invoice needs to be paid immediately, portal 112 may proceed to step 838. If payment is not due immediately but the invoice recipient(s) decides to pay it immediately, portal 112 may proceed to step 838. Alternatively, if payment is not due immediately and the invoice recipient(s) do not want to pay the invoice immediately, portal 112 may proceed to step 834.

In step 834, portal 112 may file an invoice. By filing an invoice, members decide that they do not want to do anything with the invoice at the moment. If members decide to file an invoice, portal 112 may send periodic notifications regarding the status of the invoice. Such notifications may include, for example, reminders of the due date, reminders of the amount due, reminders that additional approvals are needed, instructions on how to dispute the invoice, or other information related to invoices. This information may be stored in event database 530 (FIG. 5). Once members decide to continue with the payment of the invoice, portal 112 may proceed to step 838. Also, once invoices become immediately due, portal 112 may proceed to step 838. Alternatively, if members decide to dispute or otherwise question the invoice before the due date, portal 112 may return to step 814 or step 822.

In step 838, portal 112 may route a member's payment to the account information received in step 802. Additionally, portal 112 may use financial account information received in step 802 to make the payment. If no such information was provided in step 802, portal 112 may prompt the member for payment information. Portal 112 may receive payment information from a member. Such information may include, for example, a credit card number, a debit card number, and information that identifies other types of payment methods.

One skilled in the art will appreciate that computer programs and applications for implementing the systems and methods described herein may be stored on and/or read from computer-readable storage media. The computer-readable storage media may have stored thereon computer-executable instructions which, when executed by a computer, cause the computer to perform, among other things, the methods and processes disclosed herein. Exemplary computer-readable storage media may include magnetic storage devices, such as a hard disk, a floppy disk, magnetic tape, or another magnetic storage device known in the art; optical storage devices, such as CD-ROM, DVD-ROM, or another optical storage device known in the art; and/or electronic storage devices, such as EPROM, a flash drive, or another integrated circuit storage device known in the art. The computer-readable storage media may be embodied by or in one or more components of exemplary environment 100 (FIG. 1).

One skilled in the art will further realize that the methods and processes illustrated in this description may be implemented in a variety of ways and may include multiple other modules, programs, applications, scripts, processes, threads, or code sections that may all functionally interrelate to accomplish the individual tasks described above. For example, it is contemplated that these methods and processes may be implemented using commercially available software tools; using custom object-oriented computer code written in programming languages; using applets written in the Java programming language; or may be implemented in hardware with discrete electrical components or as one or more hardwired application-specific integrated circuits (ASIC) custom designed for this purpose. In addition, the disclosure may be implemented in a variety of different data communication network environments and may use software, hardware, or a combination of hardware and software to provide the disclosed functions.

Other embodiments of the present invention will be apparent to those skilled in the art from consideration of the specification and practice of one or more embodiments of the invention disclosed herein. It is intended that the specification and examples be considered as exemplary only, with a true scope and spirit of the invention being indicated by the following claims.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. It is intended that the specification and examples be considered as exemplary only, with a true scope and spirit of the invention being indicated by the following claims.

What is claimed is:

1. A computer-implemented system comprising:
one or more processors; and
one or more memory devices storing instructions that, when executed by the one or more processors, configure the one or more processors to perform operations comprising:
receiving a member request from a first user and a relationship request from a second user;
comparing conditions in the member request with information of the second user;
establishing a connection between the first user and the second user in response to comparing the conditions in the member request with information of the second user and determining the second user meets the conditions;
generating a user interface for at least one of the first user or the second user to enter invoice information and identify one or more invoice templates;
generating an invoice based on at least one of the one or more invoice templates and the invoice information; and
transmitting through a portal, to the first user, a notification of the invoice.

2. The computer-implemented system of claim 1, wherein comparing the conditions comprise automatically comparing insurance information received in the relationship request with insurance requirements received in the member request.

3. The computer-implemented system of claim 1, wherein the first user is associated with a customer and the second user is associated with a vendor.

4. The computer-implemented system of claim 1, wherein the operations further comprise:
   transmitting a summary of disputes to the second user based on responses from the first user after transmitting the notification.

5. The computer-implemented system of claim 1, wherein:
   the one or more processors are part of a web server;
   receiving the relationship request from the second user comprises receiving a plurality of relationships requests from a plurality of vendors;
   comparing conditions in the member request with information of the second user comprises comparing conditions in the member request with information of the plurality of vendors; and
   the operations further comprise:
      generating, in response to the plurality of relationship requests, member files in a database corresponding to the plurality of vendors;
      selectively providing for display information from at least one of the member files to an output device of the first user, the information being selected based on the member request; and
      automatically designating at least one of candidate from the plurality of vendors as an authorized vendor based on the comparison of conditions in the member request with information of the plurality of vendors.

6. The system of claim 5, wherein the notification of the invoice comprise instructions to retrieve the invoice from the web server.

7. The system of claim 1, wherein the operations further comprise:
   before generating the user interface, receiving financial account information and the one or more invoice templates from the second user.

8. The system of claim 7, wherein the account comprises at least one of bank account information, bank routing numbers, credit card information, automated clearing house information, and other information related to financial accounts.

9. The system of claim 1, wherein the operations further comprise:
   scheduling periodic notifications for the first user regarding a status of the invoice, the periodic notifications comprising data of due date, required approvals, and amount due.

10. The system of claim 1, wherein the member request and the relationship request are received through a network comprising vendor nodes, and user nodes.

11. The system of claim 1, wherein:
    the member request is a first member request;
    the conditions in the first member request are first conditions; and
    the operations further comprise:
    receiving a second member request from the first user, the second member request comprising second conditions different from the first conditions;
    transmitting the second member request to a third user, different from the second user.

12. The system of claim 1, wherein generating the user interface comprises generating a web page accessible by assigning a unique uniform resource locator.

13. The system of claim 1, wherein the operations further comprise:
    determining whether additional approvals are required before payment of the electronic invoice; and
    in response ins response to determining no additional approvals are required, routing a payment to the second user with received account information.

14. The system of claim 1, wherein establishing the connection comprises establishing a relationship by automatically sending an email comprising options to solicit additional information from relationship-requesting members and an option for rejecting the invitation.

15. A web server comprising:
    at least one processor; and
    at least one memory comprising instructions that configure the at least one processor to:
       receive a member request from a first user and a relationship request from a second user;
       compare conditions in the member request with information of the second user;
       establish a connection between the first user and the second user upon comparing the conditions in the member request with information of the second user and determining the second user meets the conditions;
       generate a user interface for the second user to enter invoice information and identify one or more invoice templates;
       generate an invoice based on at least one of the one or more invoice templates and the invoice information; and
       transmit, to the first user, a notification of the invoice.

16. The web server claim 15, wherein comparing the conditions comprise automatically comparing insurance information received in the relationship request with insurance requirements received in the member request.

17. The web server claim 15, wherein the first user is associated with a customer and the second user is associated with a vendor.

18. The web server claim 15, wherein the instructions further configure the processor to:
    transmit a summary of disputes to the second user based on responses from the first user after transmitting the notification.

19. The web server claim 15, wherein:
    receiving the relationship request from the second user comprises receiving a plurality of relationships requests from a plurality of vendors;
    comparing conditions in the member request with information of the second user comprises comparing conditions in the member request with information of the plurality of vendors; and
    the instructions further configure the processor to:
       generate, in response to the plurality of relationship requests, member files in a database corresponding to the plurality of vendors;
       selectively provide for display information from at least one of the member files to an output device of the first user, the information being selected based on the member request; and
       automatically designate at least one of candidate from the plurality of vendors as an authorized vendor based on the comparison of conditions in the member request with information of the plurality of vendors.

20. A computer-implemented method comprising:

receiving a member request from a first user and a relationship request from a second user;

comparing conditions in the member request with information of the second user;

establishing a connection between the first user and the second user upon comparing the conditions in the member request with information of the second user and determining the second user meets the conditions;

generating a user interface for the second user to enter invoice information and identify one or more invoice templates;

generating an invoice based on at least one of the one or more invoice templates and the invoice information; and transmitting, to the first user, a notification of the invoice.

* * * * *